(12) United States Patent
Gu

(10) Patent No.: US 6,676,148 B1
(45) Date of Patent: Jan. 13, 2004

(54) FRONT WHEEL DRIVE CHILD RIDING TOY VEHICLE

(76) Inventor: Hong-Jiun Gu, P.O. Box No. 6-57, Chung-Ho, Taipei 235 (TW)

( * ) Notice: Subject to any disclaimer, the term of this patent is extended or adjusted under 35 U.S.C. 154(b) by 0 days.

(21) Appl. No.: 10/236,985

(22) Filed: Sep. 9, 2002

(51) Int. Cl.⁷ ............................................... B62M 1/16
(52) U.S. Cl. ..................................................... 280/244
(58) Field of Search ........................... 280/242.1, 244, 280/245, 246, 247, 248

(56) References Cited

U.S. PATENT DOCUMENTS

| | | | | |
|---|---|---|---|---|
| 1,309,855 A | * | 7/1919 | Johnson ..................... | 280/240 |
| 1,572,335 A | * | 2/1926 | Valkenburg ................ | 280/240 |
| 2,732,221 A | * | 1/1956 | Welch ........................ | 280/246 |
| 3,381,975 A | * | 5/1968 | Bowman .................... | 280/240 |
| 3,874,700 A | * | 4/1975 | Lohr et al. ................. | 280/240 |
| 5,308,097 A | * | 5/1994 | Bono et al. ................ | 280/234 |
| 2002/0096855 A1 | * | 7/2002 | Lee ............................ | 280/244 |

FOREIGN PATENT DOCUMENTS

WO      wo 92/13750 A1  *  8/1992

* cited by examiner

*Primary Examiner*—Kevin Hurley

(57) ABSTRACT

A front wheel drive child riding toy vehicle including a vehicle body, a power handle rod, a front wheel set, a shaft bracket and a rear wheel set mainly aims to generate a linearly proceeding function through a forward and rearward sway of the power handle rod, a rearward moving function through a forward and rearward sway of the power handle rod after being steered at 180 degrees, a steering function through a left and right rotation of the power hand rod without affecting the linearly proceeding structure of the vehicle body and to rotate at 360 degrees in a stationary state.

9 Claims, 7 Drawing Sheets

FRONT WHEEL DRIVE CHILD RIDING TOY VEHICLE

BACKGROUND OF THE INVENTION

The operation methods of patterns related to child riding toy twisting or swaying vehicles (for examples, Taiwan Public No. 427.186, 454539, 479543, 488311, 486984 and 486985) utilize a left and right swaying of a handle bar to drive a toy vehicle to proceed in an S shape. As to using a forward and rearward sway of a handle rod to drive a toy vehicle to proceed linearly, the only embodiment has been applied to a skate board vehicle (for example, Taiwan Public No. 487093), but not to a child riding toy vehicle. Although a vehicle proceeding in an S shape is capable of achieving the interesting operation effect, the speed is slower than that of a skate board vehicle proceeding linearly. Furthermore, to operate through swaying left and right wastes more work than swaying forward and rearward. Therefore, to operate through swaying forward and rearward is more labor-saving. However, the skate board vehicle proceeding linearly through using a handle rod is able to control the proceeding of the vehicle only, but not the steering of a front wheel. The structure of the skate board vehicle is different from that of the child riding toy vehicle; the user has to stand on the skate board and steers the vehicle according to the different centers of gravity on the left and right sides thereof. However, this kind of steering method is not suitable for the child riding toy twisting or swaying vehicle. Therefore, it is impossible to apply the operation method of using the handle rod to sway forward and rearward for driving the vehicle to proceed unidirectionally onto a child riding toy vehicle. In view of the abovementioned problem, the inventor of the present invention has developed a solving method.

Furthermore, the conventional skate board vehicle proceeding unidirectionally is of a rear wheel drive instead of a front wheel drive. The reason is that the height of the skate board vehicle is lower and it is hard to dispose a driving or speed changing structure on the front wheel. Therefore, the inventor of the present invention has developed a child riding toy vehicle is a front wheel drive structure with variable speeds.

SUMMARY OF THE INVENTION

A front wheel drive child riding toy vehicle comprising a vehicle body, a power handle rod, a front wheel set, a shaft bracket and a rear wheel set is characterized that the power handle rod is pivotally disposed on the shaft bracket through a turning shaft and drives a front wheel driving mechanism at a lower end through a link mechanism disposed in a proper area on the shaft bracket. The front wheel driving mechanism has a unidirectional driving function and belongs to a same shaft system of the front wheel set. Therefore, under the forward and rearward sways of the power handle rod, the vehicle body makes the front wheel set generates a unidirectional proceeding or backup function; since the shaft bracket and the vehicle body are pivotally disposed for connection, the power handle rod, the shaft bracket and the front wheel set are capable of rotating at 360 degrees.

To enable a further understanding of the structural features and the technical contents of the present invention, the brief description of the drawings below is followed by the detailed description of the preferred embodiment.

DETAILED DESCRIPTION OF THE PREFERRED EMBODIMENTS

The First Embodiment

Figure 1:
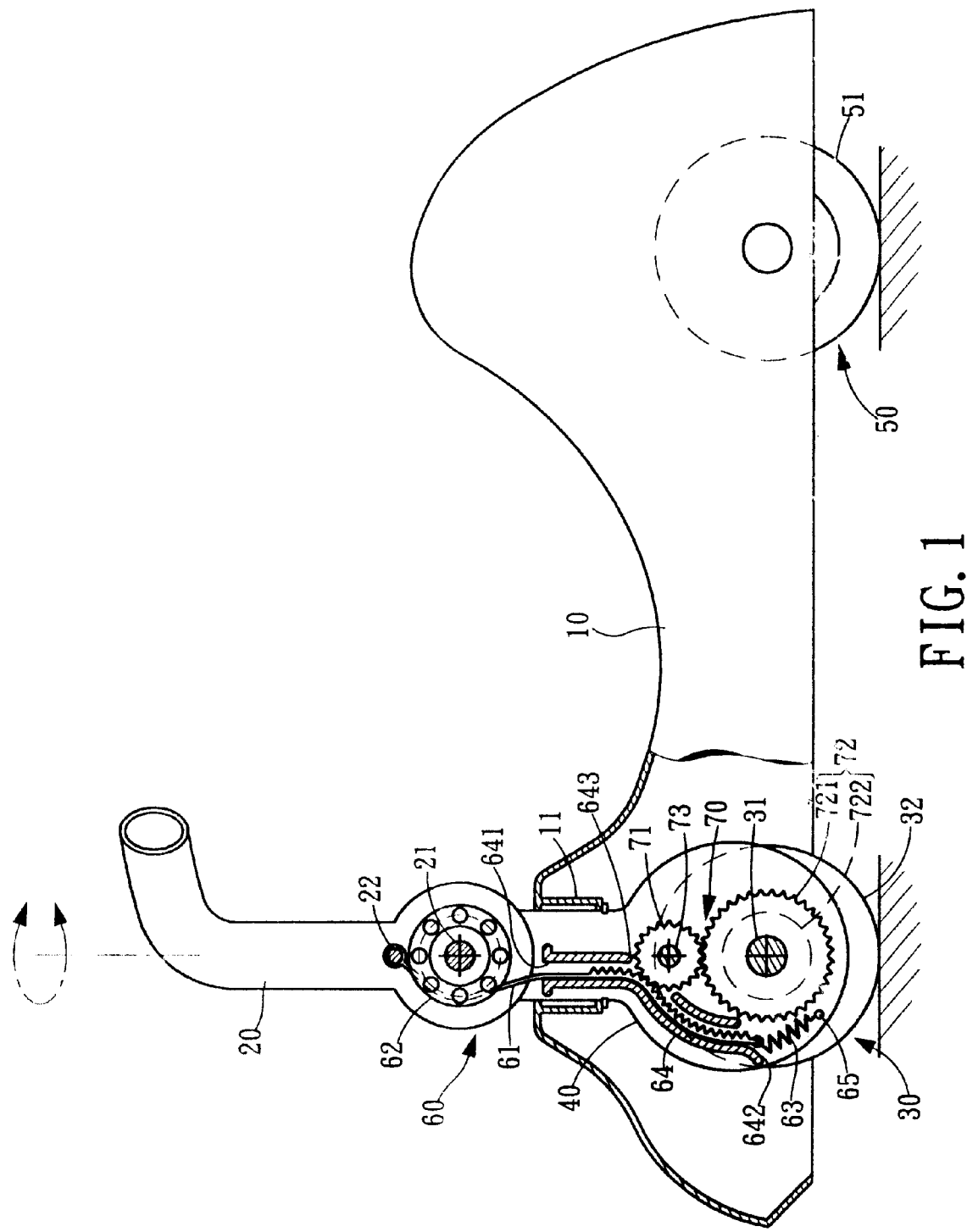
FIG. 1 is a complete cross-sectional drawing of the first embodiment of the present invention of a child riding toy vehicle.
Figure 2:
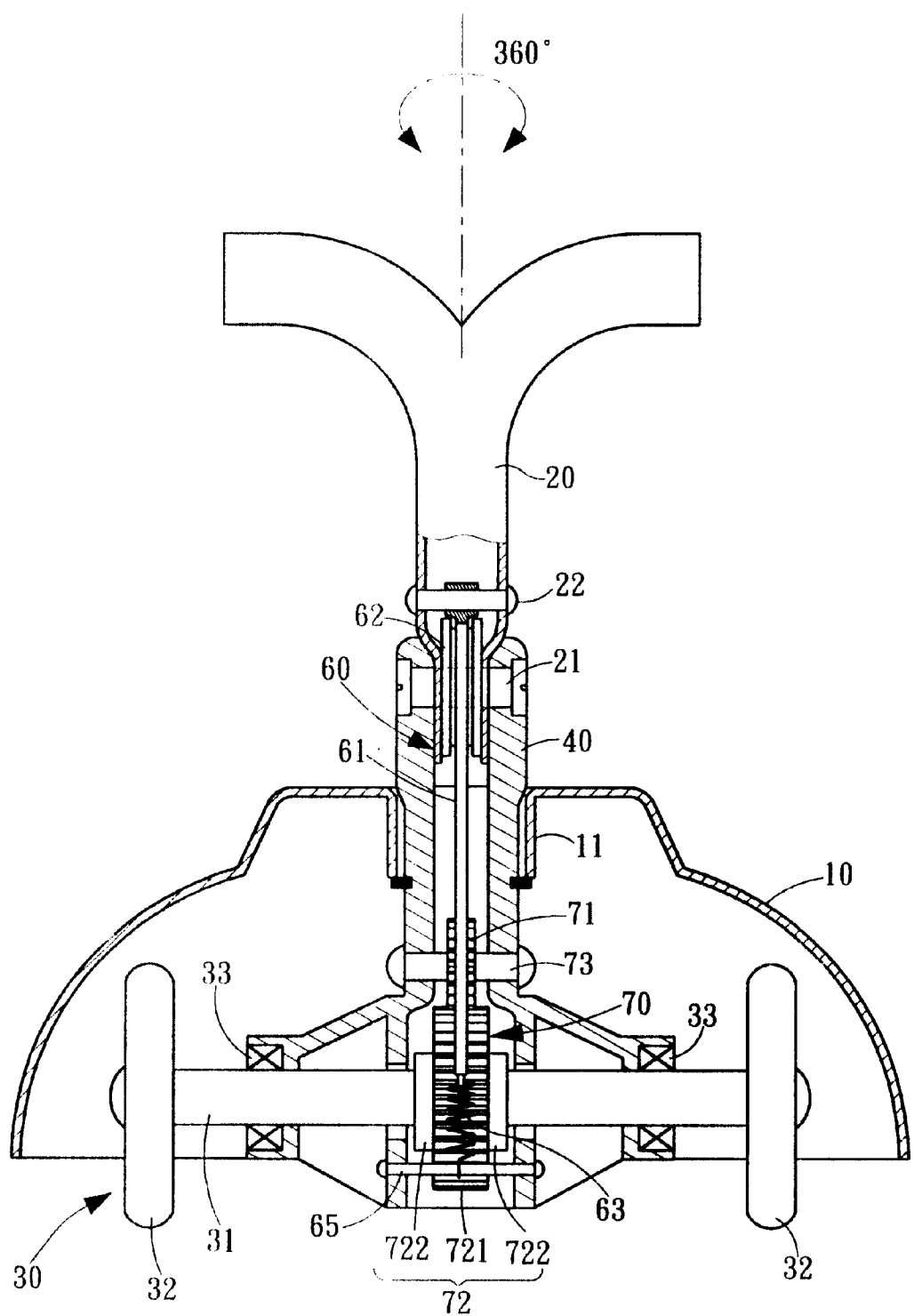
FIG. 2 is a longitudinal cross-sectional drawing of the first embodiment of the child riding toy vehicle; however, a steering seat is deleted for displaying a gear rack.

FIG. 1 shows the complete cross-sectional drawing of the present invention of a child riding toy vehicle and FIG. 2 shows the longitudinal cross-sectional drawing of the present invention. The basic structure comprises a vehicle body (10), a power handle rod (20), a front wheel set (30), a shaft bracket (40) and a rear wheel set (50); wherein the power handle rod (20) drives a front wheel driving mechanism (70) at a lower end through a link mechanism (60) disposed in a proper area on the shaft bracket (40). The front wheel driving mechanism (70) and the front wheel set (30) belong to a same shaft system. Therefore, under the forward and rearward sways of the power handle rod (20), the vehicle body (10) generates a unidirectional proceeding function. The power handle rod (20) is pivotally disposed on the shaft bracket (40) through a turning shaft (21) which is vertically and pivotally disposed in a front shaft sleeve (11) of the vehicle body (10). The lower end of the shaft bracket (40) is disposed with the set of front wheel driving mechanism (70) which comprises a transmission gear (71) and a unidirectional driven gear (72) meshed together. The transmission gear (71) is disposed on a branch shaft (73); the unidirectional driven gear (72) and the front wheel set (30) share a same wheel shaft (31). Furthermore, the power handle rod (20) drives the front wheel driving mechanism (70) through a link mechanism (60) which comprises a gear rack (61), a guide wheel (62), a resuming spring (63) and a steering seat (64); wherein, the upper end of the gear rack (61) is fixed at a lower end of the power handle rod (20) through a shaft bolt (22); the gear rack (61) coils on the guide wheel (62) which is pivotally disposed on the turning shaft (21) with the power handle rod (20). The lower end of the gear rack (61) is guided into the steering seat (64) to mesh with the transmission gear (71); the lower end thereof connects with the resuming spring (63); the other end of the resuming spring (63) is hooked onto the branch shaft (65) below the shaft bracket (40).

In addition, the steering seat (64) works as a bent rail and has three openings, an upper inlet (641), a lower outlet (642) and a central guide inlet (643); wherein, the guide inlet (643) is an opening for the meshing of the gear rack (61) and the transmission gear (71). The ascendance of the gear rack (61) drives the transmission gear (71) to rotate. Furthermore, the unidirectional driven gear (72) is assembled by a flying wheel (721) and a left and right chain wheel (722); wherein, the flying wheel (721) meshes with the transmission gear (71); the two left and right chain wheels (722) engage with the flying wheel (721); the flying wheel (721) only rotates unidirectionally and forwardly but not moves rearward.

The front wheel set (30) is assembled by the wheel shaft (31), two front wheels (32) respectively disposed at the left and the right ends of the wheel shaft (31) as well as two bearings (33) disposed between the wheel shaft (31) and the shaft bracket (40). The rear wheel set (50) comprises one or two rear wheels (51) respectively disposed at the rear aspect of the vehicle body (10); the rear wheel (51) has no driving function but been used for balancing the vehicle body (10).

Figure 3:
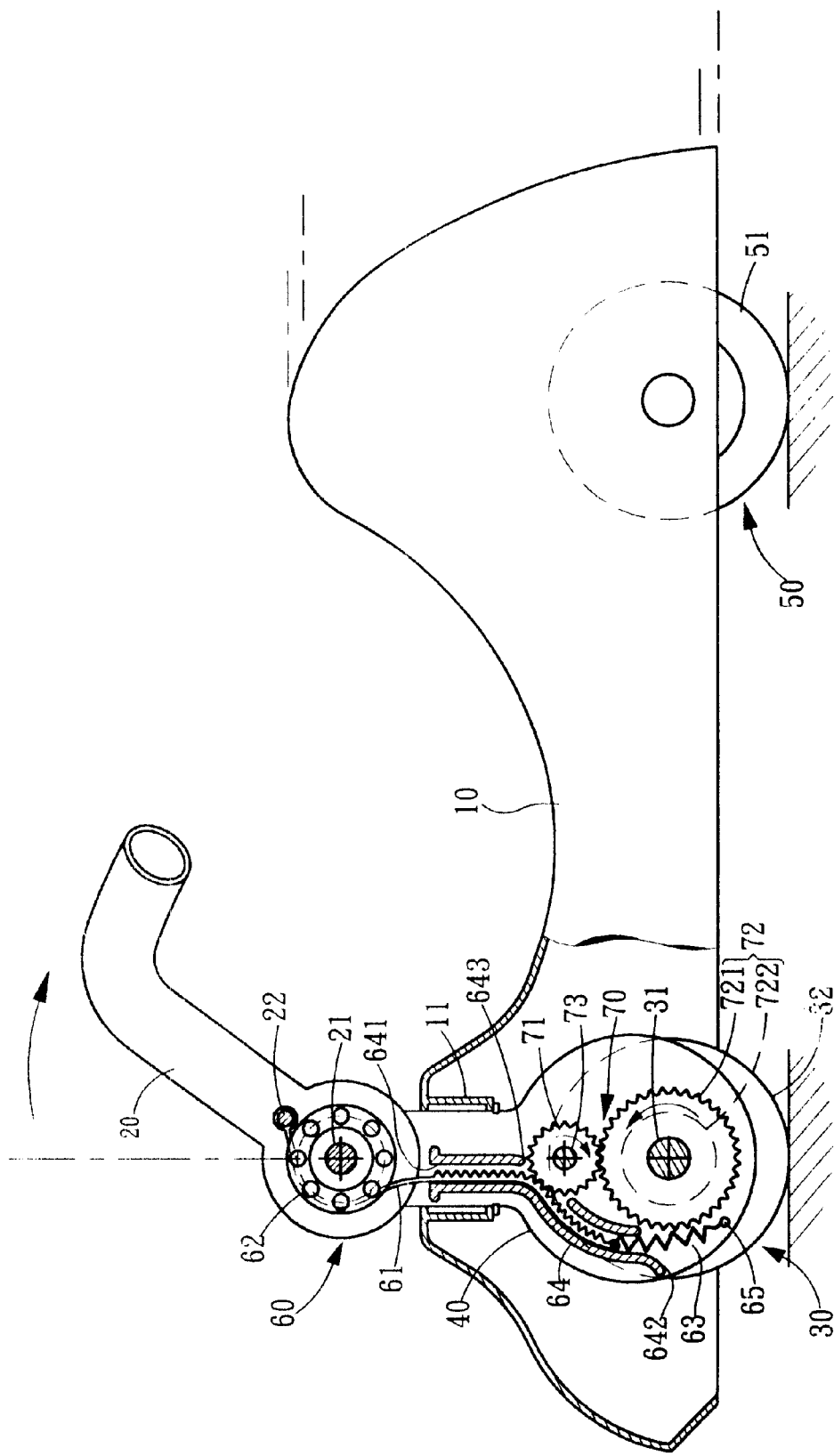
FIG. 3 is a schematic drawing of the movement of the first embodiment of the child riding toy vehicle.

FIG. 3 shows the schematic drawing of the movement of the present invention. As indicated, the power handle rod (20) sways rearward to drive the gear rack (61) at the lower end thereof to ascend. Since the gear rack (61) and the transmission gear (71) mesh, they drive the transmission gear (71) and the unidirectional driven gear (72) to rotate synchronously thereby further driving the front wheel set (30) to generate the proceeding function. Reversely, when the power handle rod (20) sways forwardly, as indicated in FIG. 1, the gear rack (61) resumes by the contracting function of the resuming spring (630) at the distal end thereof. At this time, the unidirectional driven gear (72) generates a spinning function through the flying wheel (721) to prevent the front wheel set (30) to rotate rearward. Continuous and reciprocating forward and rearward sways of the power handle rod (20) enable the front wheel set (30) to only proceed unidirectionally but not move rearward thereby forming a driving method of only proceeding forward but not moving rearward.

In addition, when the power handle rod (20) steers, it directly steers the shaft bracket (40) thereby making the front wheel set (30) steer as well. Since the shaft bracket (40) and the vehicle body (10) are pivotally disposed for connection, they can rotate at 360 degrees. Therefore, the rotation at 180 degrees of the power handle rod (20), the shaft bracket (40) and the front wheel set (30) as well as the forward sway of the power handle rod (20) enable the vehicle body (10) to move rearward. Reversely, the rearward sway of the power handle rod (20) prevents the vehicle body (10) to move forwardly due to the spinning function generated from the unidirectional driven gear (72).

The Second Embodiment

Figure 4:
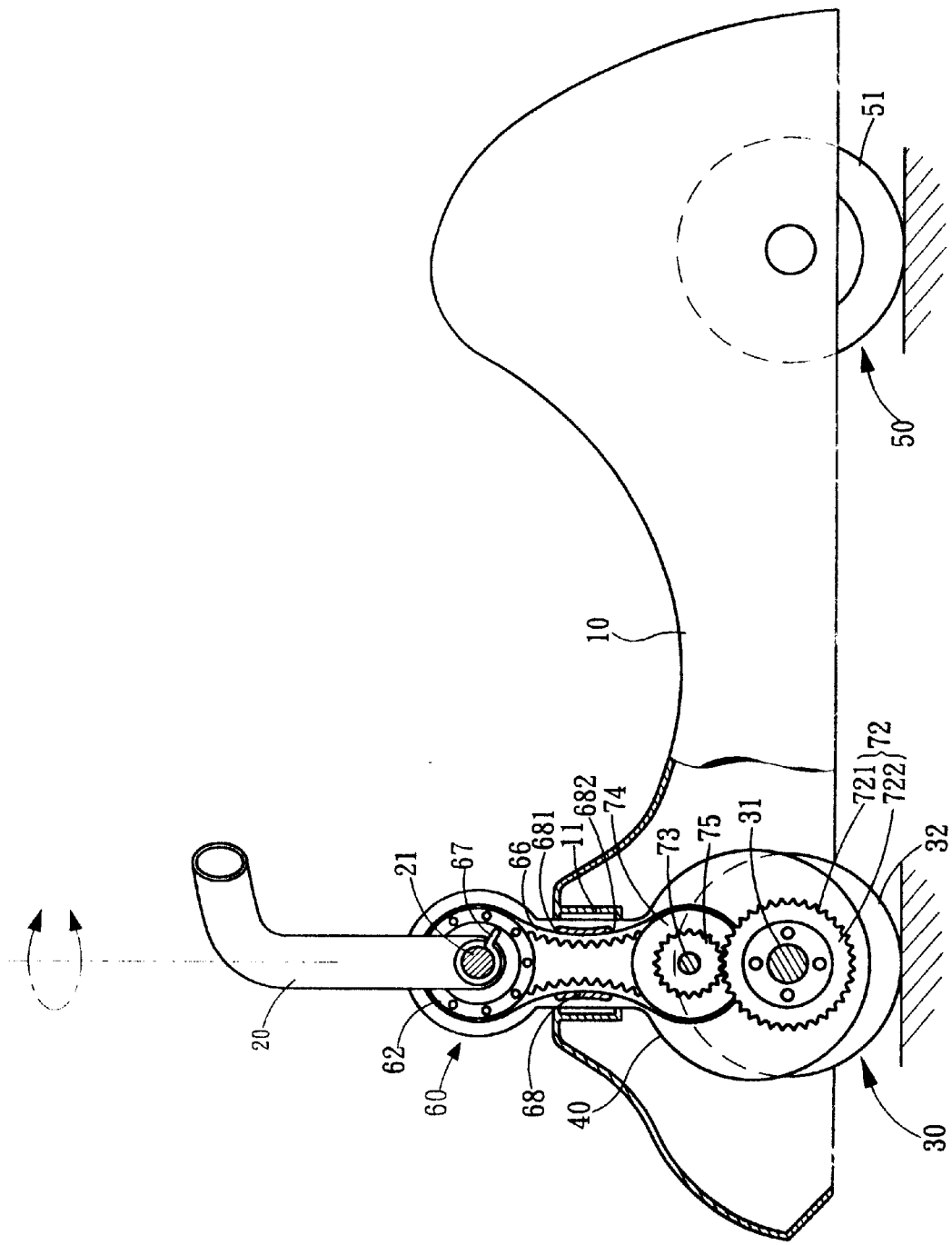
FIG. 4 is a complete cross-sectional drawing of the second embodiment of the present invention of a child riding toy vehicle.
Figure 5:
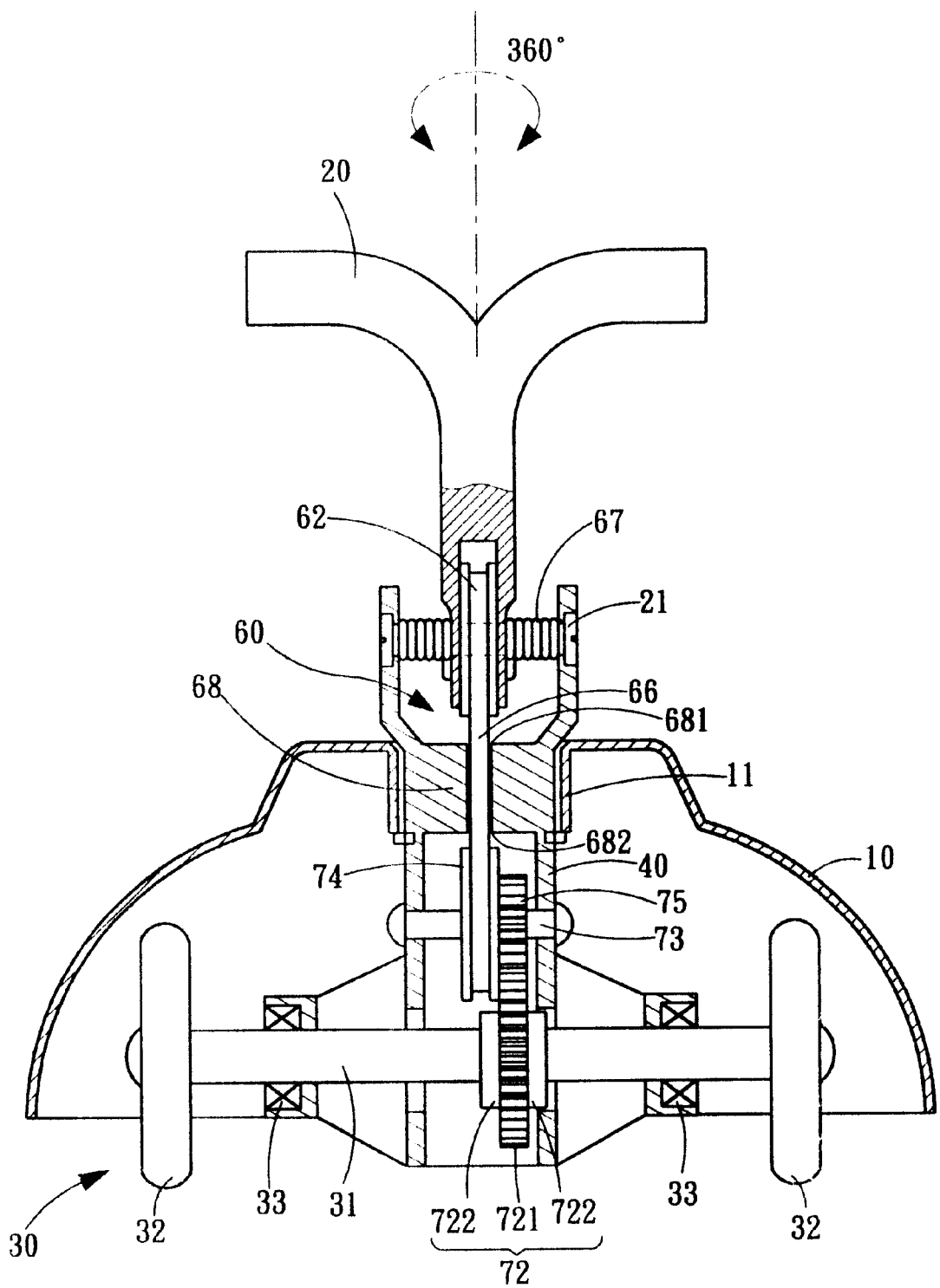
FIG. 5 is a longitudinal cross-sectional drawing of the second embodiment of the child riding toy vehicle; however, a steering seat is deleted for displaying a gear rack.

FIG. 4 shows the complete cross-sectional drawing of the present invention of a child riding toy vehicle and FIG. 5 shows the longitudinal drawing of the present invention. The basic structure thereof comprises a vehicle body (10), a power handle rod (20), a front wheel set (30), a shaft bracket (40) and a rear wheel set (50); wherein the power handle rod (20) drives a front wheel driving mechanism (70) at a lower end through a link mechanism (60) disposed in a proper area on the shaft bracket (40). The front wheel driving mechanism (70) and the front wheel set (30) belong to a same shaft system. Therefore, under the forward and rearward sways of the power handle rod (20), the vehicle body (10) generates a unidirectional proceeding function. The power handle rod (20) is pivotally disposed on the shaft bracket (40) through a turning shaft (21) which is vertically and pivotally disposed in a front shaft sleeve (11) of the vehicle body (10). The lower end of the shaft bracket (40) is disposed with the set of front wheel driving mechanism (70) which comprises a toothed belt pulley (74), a gear (75) on a co-axle (73) of the belt pulley (74) and a unidirectional driven gear (72) meshed with the gear (75). The unidirectional driven gear (72) and the front wheel set (30) share a same wheel shaft (31). The unidirectional driven gear (72) is assembled by a flying wheel (721) and a left and right chain wheel (722) to have the function of rotating unidirectionally. Furthermore, the power handle rod (20) drives the front wheel driving mechanism (70) through a link mechanism (60) which comprises a cycling belt or chain (66), a guide wheel (62) disposed on a turning shaft (21), a resuming spring (67) and a steering seat (68) for guiding the cycling belt (66); wherein, the cycling belt (66) is a toothed belt coiling between the guide wheel (62) and the toothed belt wheel (74) as well as guided by a steering seat (68) to rotate steadily; the steering seat (68) works like a guiding rail and has two openings, an upper inlet (681) and a lower outlet (682); two lateral walls thereof are slightly arcuate to force the cycling belt (66) to taut without any loosening situation.

The front wheel set (30) is assembled by the wheel shaft (31), two front wheels (32) respectively disposed at the left and the right ends of the wheel shaft (31) as well as two bearings (33) disposed between the wheel shaft (31) and the shaft bracket (40). The rear wheel set (50) comprises one or two rear wheels (51) respectively disposed at the rear aspect of the vehicle body (10); the rear wheel (51) has no driving function but been used for balancing the vehicle body (10).

Figure 6:
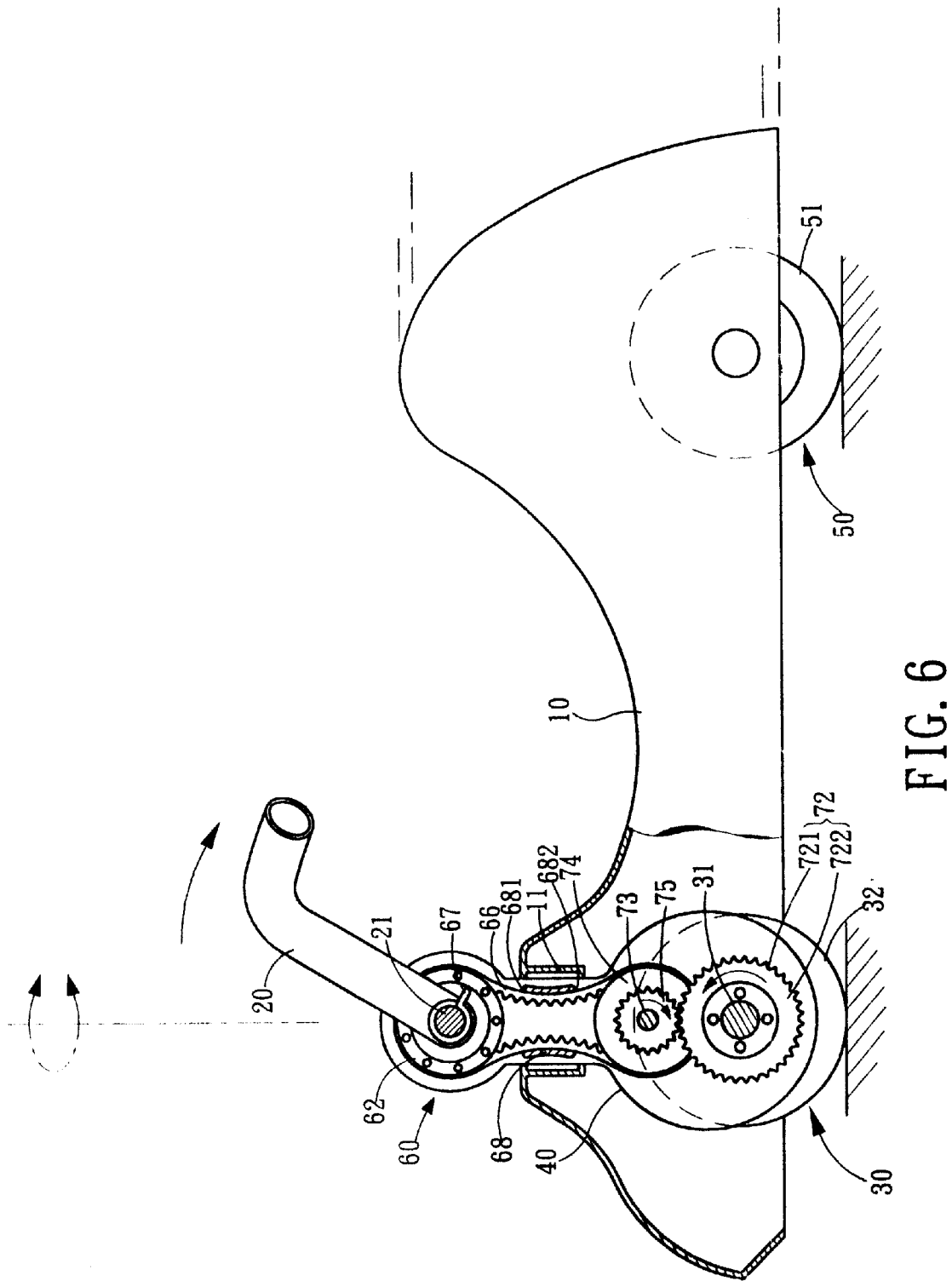
FIG. 6 is a schematic drawing of the proceeding movement of the second embodiment of the child-riding toy vehicle.

FIG. 6 shows the schematic drawing of the proceeding movement of the present invention. As indicated, when the power handle rod (20) sways rearward, the guide wheel (62) drives the cycling belt (66) to rotate positively thereby further driving the toothed belt wheel (74) to rotate; the belt wheel (74) drives the gear (75) of the co-axle (73) and then the gear (75) drives the unidirectional driven gear (72) to rotate synchronously thereby driving the front wheel set (30) to proceed. Reversely, as indicated in FIG. 4, when the power handle rod (20) sways forwardly, the guide wheel (62) resumes through the contracting function of the resuming spring (67); at the meantime, the cycling belt (66) also resumes and that further makes the belt wheel (74) and the gear (75) resume. However, at this time, the unidirectional driven gear (72) generates a spinning function through the flying wheel (721) to prevent the front wheel set (30) to rotate rearward. Continuous and reciprocating forward and rearward sways of the power handle rod (20) enable the front wheel set (30) to only proceed unidirectionally but not move rearward thereby forming a driving method of only proceeding forward but not moving rearward. Furthermore, an intermediate gear (not shown) can be disposed between the gear (75) and the unidirectional driven gear (72) for accelerating or reducing the speed. The technique of using the intermediate gear to change the speed is of a known prior art and won't be further described herein.

In addition, when the power handle rod (20) steers, it directly steers the shaft bracket (40) thereby making the front wheel set (30) steer as well and the vehicle body (10) steer left and right.

Figure 7:
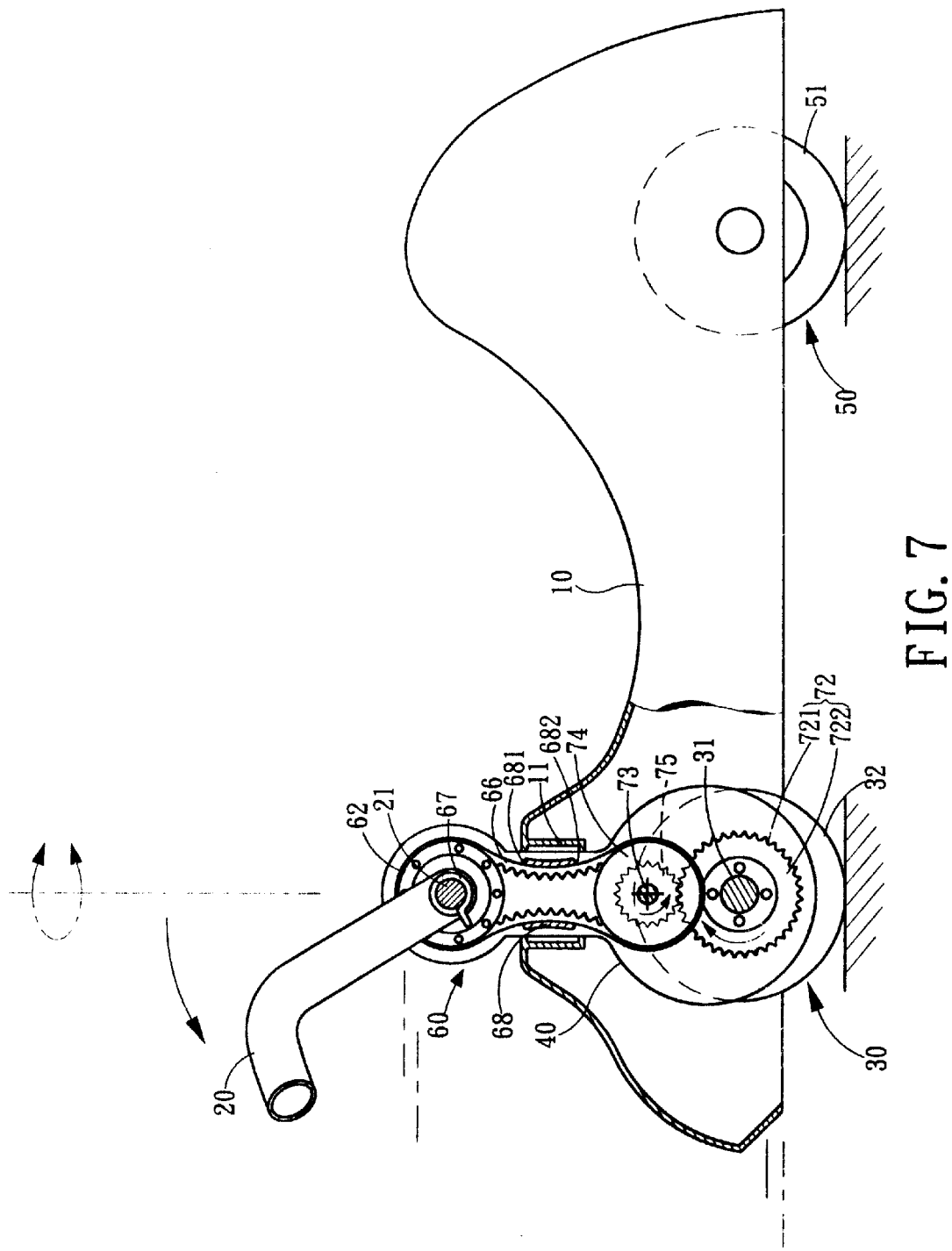
FIG. 7 is a schematic drawing of the backup movement of the second embodiment of the child riding toy vehicle.

FIG. 7 shows the schematic drawing of the rearward movement of the present invention. As indicated, the shaft bracket (40) is pivotally disposed with the vehicle body (10) for connection (by disposing a shaft sleeve inside a front shaft sleeve (11) or a retaining ring thereunder) and for rotating at 360 degrees. Therefore, when the power handle rod (20), the shaft bracket (40) and the front wheel set (30) synchronously rotate at 180 degrees, plus the power handle rod (20) sways forwardly, the vehicle body (10) moves rearward. Reversely, when the power handle rod (20) sways rearward, the unidirectional driven gear (72) spins to disable the vehicle body (10) to move forwardly.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A front wheel drive child riding toy vehicle comprising a vehicle body, a power handle rod, a front wheel set, a shaft bracket and a rear wheel set is characterized that:

the power handle rod is pivotally disposed on the shaft bracket through a turning shaft and drives a front wheel driving mechanism at a lower end through a link mechanism disposed on the shaft bracket; the front wheel driving mechanism and the front wheel set belong to a same shaft system thereby enabling the vehicle body to proceed or backup unidirectionally under the forward and rearward sways of the power handle rod; since the shaft bracket and the vehicle body are pivotally disposed for connection, the power handle rod, the shaft bracket and the front wheel set are capable of rotating at 360 degrees.

2. The front wheel drive child riding toy vehicle according to claim 1, wherein the shaft bracket is vertically and pivotally disposed in a front shaft sleeve of the vehicle body and capable of rotating at 360 degrees.

3. The front wheel drive child riding toy vehicle according to claim 1, wherein the front wheel driving mechanism comprises a transmission gear and a unidirectional driven gear; both gears mesh together.

4. A front wheel drive child riding toy vehicle according to claim 3, wherein a link mechanism comprises a gear rack, a guide wheel, a resuming spring and a steering seat; wherein, the upper end of the gear rack is fixed at a lower end of the power handle rod through a shaft bolt; the gear rack coils on the guide wheel which is pivotally disposed on a turning shaft with the power handle rod; the lower end of the gear rack is guided into the steering seat to mesh with the transmission gear; the lower end thereof connects with the resuming spring; the other end of the resuming spring is hooked onto the branch shaft below a shaft bracket.

5. A front wheel drive child riding toy vehicle according to claim 4, wherein the steering seat works as a bent rail and has three openings, an upper inlet, a lower outlet and a central guide inlet; wherein, the central guide inlet is an opening for the meshing between the gear rack and the transmission gear.

6. A front wheel drive child riding toy vehicle according to claim 1, wherein a front wheel driving mechanism comprises a toothed belt pulley, a gear on a co-axle of the belt pulley and a unidirectional driven gear meshed with the gear; the unidirectional driven gear and the front wheel set share a same wheel shaft.

7. A front wheel drive child riding toy vehicle according to claim 6, wherein a link mechanism comprises a cycling toothed belt, a guide wheel disposed on a turning shaft, a resuming spring and a steering seat for guiding the cycling belt; wherein, the cycling belt coils between the guide wheel and the toothed belt wheel as well as guided by a steering seat to rotate steadily.

8. A front wheel drive child riding toy vehicle according to claim 7, wherein the steering seat works like a guiding rail and has two openings, an upper inlet and a lower outlet; two lateral walls thereof are slightly arcuate to force the cycling belt to taut without any loosening situation.

9. A front wheel drive child riding toy vehicle according to claims 3 and 6, wherein the unidirectional driven gear is assembled by a flying wheel and a left and right chain wheel thereby having a function of rotating unidirectionally.

* * * * *